(12) United States Patent
Smith et al.

(10) Patent No.: US 8,083,828 B2
(45) Date of Patent: Dec. 27, 2011

(54) FIBER WEB HAVING A HIGH STIFFNESS

(75) Inventors: Bruce Smith, Copper Hill, VA (US); Sudhakar Jaganathan, Roanoke, VA (US)

(73) Assignee: Hollingsworth & Vose Company, East Walpole, MA (US)

( * ) Notice: Subject to any disclaimer, the term of this patent is extended or adjusted under 35 U.S.C. 154(b) by 65 days.

(21) Appl. No.: 12/488,334

(22) Filed: Jun. 19, 2009

(65) Prior Publication Data

US 2010/0319310 A1 Dec. 23, 2010

(51) Int. Cl.
*B01D 46/00* (2006.01)

(52) U.S. Cl. ............... 55/527; 55/524; 55/528; 442/59; 442/327

(58) Field of Classification Search ............ 55/361–382, 55/385.1–385.4, 521, 527–528, 522; 442/59–417; 210/483–510.1
See application file for complete search history.

(56) References Cited

U.S. PATENT DOCUMENTS

| | | |
|---|---|---|
| 4,961,974 A | 10/1990 | Jones |
| 5,397,632 A | 3/1995 | Murphy, Jr. et al. |
| 5,580,459 A | 12/1996 | Powers et al. |
| 5,672,399 A | 9/1997 | Kahlbaugh et al. |
| 5,709,735 A | 1/1998 | Midkiff et al. |
| 5,785,725 A | 7/1998 | Cusick et al. |
| 5,820,645 A | 10/1998 | Murphy, Jr. |
| 5,851,355 A | 12/1998 | Goettmann |
| 5,948,344 A | 9/1999 | Cusick et al. |
| 5,993,501 A | 11/1999 | Cusick et al. |
| 6,171,684 B1 | 1/2001 | Kahlbaugh et al. |
| 6,254,653 B1 | 7/2001 | Choi et al. |
| 6,419,839 B1 | 7/2002 | Cox et al. |
| 6,485,811 B1 | 11/2002 | Horiguchi et al. |
| 6,579,350 B2 | 6/2003 | Doherty |
| 6,758,878 B2 | 7/2004 | Choi et al. |
| 6,802,315 B2 | 10/2004 | Gahan et al. |
| 7,008,465 B2 | 3/2006 | Graham et al. |
| 7,137,510 B1 | 11/2006 | Klein et al. |
| 7,153,793 B2 | 12/2006 | Willis et al. |
| 7,309,372 B2 | 12/2007 | Kahlbaugh et al. |
| 7,314,497 B2 | 1/2008 | Kahlbaugh et al. |
| 2003/0113509 A1* | 6/2003 | Lugg ........................... 428/137 |
| 2005/0138906 A1* | 6/2005 | Kubokawa et al. ............ 55/497 |
| 2006/0096932 A1 | 5/2006 | Dema et al. |
| 2006/0117730 A1* | 6/2006 | Chung et al. ................... 55/524 |

(Continued)

FOREIGN PATENT DOCUMENTS

WO WO 2010/010234 A1 1/2010

OTHER PUBLICATIONS

International Search Report and Written Opinion for Application No. PCT/US2010/038978 mailed Aug. 31, 2010.

*Primary Examiner* — Duane Smith
*Assistant Examiner* — Thomas McKenzie
(74) *Attorney, Agent, or Firm* — Wolf, Greenfield & Sacks, P.C.

(57) ABSTRACT

The fiber webs described herein may be incorporated into filter media and filter elements. The webs may exhibit a high permeability and stiffness, at a low thickness. The stiffness can be sufficient for the webs to be pleated to include sharp, well-defined peaks which can be maintained in a stable configuration during use.

33 Claims, 1 Drawing Sheet

U.S. PATENT DOCUMENTS

| | | |
|---|---|---|
| 2006/0137317 A1* | 6/2006 | Bryner et al. .................. 55/528 |
| 2007/0023958 A1 | 2/2007 | LaVietes et al. |
| 2007/0166540 A1 | 7/2007 | Baba et al. |
| 2007/0227359 A1* | 10/2007 | Choi ................................ 96/11 |
| 2008/0022643 A1 | 1/2008 | Fox et al. |
| 2008/0078152 A1* | 4/2008 | Smithies ....................... 55/524 |
| 2008/0120954 A1* | 5/2008 | Duello et al. .................. 55/528 |
| 2008/0202078 A1 | 8/2008 | Healey et al. |
| 2011/0084017 A1 | 4/2011 | Pocher et al. |

* cited by examiner

FIBER WEB HAVING A HIGH STIFFNESS

FIELD OF INVENTION

The present invention relates generally to filtration and, more particularly, to a fiber web that can be used in filter elements.

BACKGROUND OF INVENTION

Filter elements can be used to remove contamination in a variety of applications. Such elements can include one or more fiber web(s). The fiber web(s) provide a porous structure that permits fluid (e.g., gas, liquid) to flow through the element. Contaminant particles contained within the fluid may be trapped on the fiber web(s). In filter elements that include multiple fiber webs, different web(s) may be designed to perform different functions and, thus, may have different characteristics and properties. For example, the filter element may include a fiber web that is primarily designed to filter contaminants (e.g., an efficiency web), and another fiber web that is primarily designed to provide mechanical integrity (e.g., a backing).

Permeability relates to the ability of a fiber web to transmit fluid. It can be expressed as the volume of fluid per unit of time that passes through a unit area of a fiber web at a fixed differential pressure. Filter elements that include multiple fiber webs may include webs having different permeability. For example, web(s) that provide mechanical integrity (e.g., a backing), but are generally not relied on for filtering performance, may be designed to have a high permeability so that such web(s) do not lower the overall permeability of the filter media.

Fiber web(s) can be folded to include sharp, well-defined pleats that increase the fiber web surface area which can increase overall efficiency and performance. Fiber webs that do not pleat well may form rounded, non-uniform pleats, when folded. Such non-uniformity may crowd the space between pleats which ultimately restricts air flow, resulting in lowered efficiency and increased resistance to fluid flow across the fiber web. Several fiber web properties can contribute to its ability to pleat well including stiffness and thickness. In general, it may be difficult to pleat fiber web(s) having a high permeability and a low thickness since such web(s) typically may not have a sufficient stiffness, amongst other factors.

SUMMARY OF INVENTION

Fiber webs that can be used in filter elements are described.

In one embodiment, a fiber web is provided. The fiber web has a permeability of greater than about 500 cfm/sf, a stiffness of greater than about 500 mg, and a thickness of less than about 25 mils.

In one embodiment, a fiber web is provided. The fiber web has a permeability of greater than about 500 cfm/sf and a stiffness of greater than about 500 mg. The fiber web comprises multi-component fibers, wherein the multi-component fibers comprise greater than 50 percent by weight of the total weight of fibers in the fiber web.

In one embodiment, a fiber web is provided. The fiber web has a permeability of greater than about 500 cfm/sf and a thickness of less than about 25 mils. The fiber web comprises binder fibers and a resin. The binder fibers comprise a polymer and the resin comprises a polymer, and the polymer of the binder fibers is in the same class as the polymer of the resin.

In one embodiment, a method of filtering a fluid is provided. The method comprises filtering a fluid using a filter element comprising a fiber web. The fiber web has a permeability of greater than about 500 cfm/sf, a stiffness of greater than about 500 mg, and a thickness of less than about 25 mils.

In one embodiment, a method of manufacturing a fiber web is provided. The method comprises forming a fiber web that has a permeability of greater than about 500 cfm/sf, a stiffness of greater than about 500 mg, and a thickness of less than about 25 mils.

Other aspects, embodiments, advantages and features of the invention will become apparent from the following detailed description. In cases in which there is inconsistency between the present specification and references that are incorporated herein by reference, the present specification shall control.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
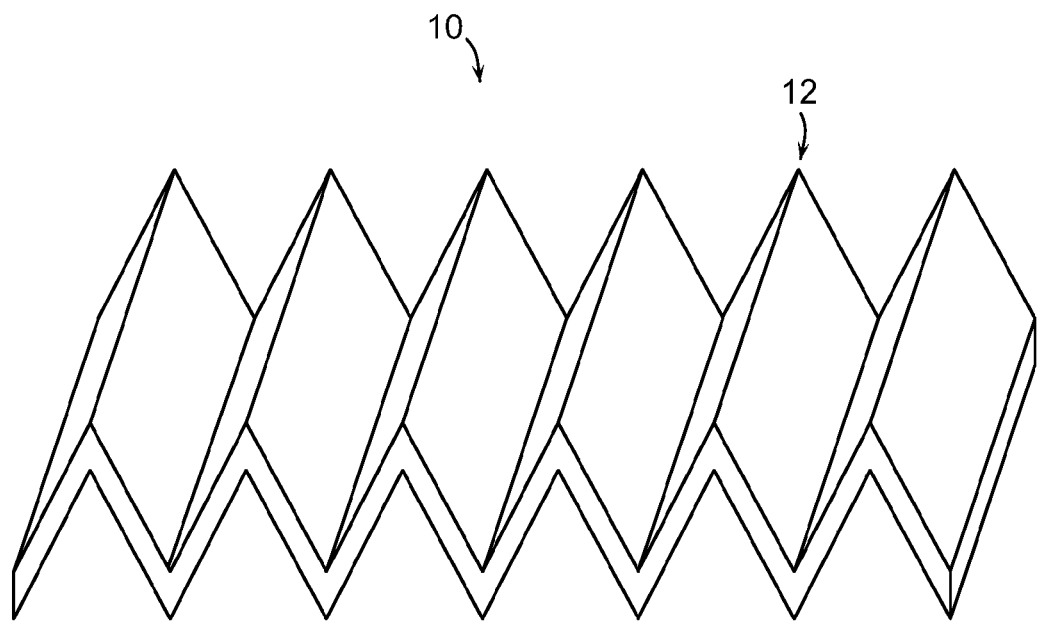
FIG. 1 depicts a pleated fiber web in accordance with some embodiments.

The fiber webs described herein may be incorporated into filter media and filter elements. The webs may exhibit a high permeability and stiffness, at a low thickness. The stiffness can be sufficient for the webs to be pleated to include sharp, well-defined peaks which can be maintained in a stable configuration during use. As described further below, the fiber web may include various components, such as binder fibers, non-binder fibers, resin, and other additives, that are selected and combined to impart the desired properties. In some cases, a fiber web having the above-described characteristics may be combined (e.g., as a backing) with one or more additional fiber webs when incorporated into filter media and filter elements. The filter elements can be used in a variety of applications including room air cleaning, engine/cabin air cleaning, gas turbine filtration, dust collection, liquid filtration, as well as heating, ventilation and air conditioning (HVAC) and high efficiency particulate air (HEPA) applications, amongst others.

As noted above, the fiber web is formed of one or more types of fibers, a resin, and one or more optional additives. The fiber web may be non-woven. That is, the fiber web is processed using techniques that result in a non-woven web, as described further below.

In some cases, the fibers may be the principal component of the fiber web. That is, the total fiber weight percentage may be greater than the weight percentage of any other component in the web. For example, the fiber component(s) may comprise greater than about 50% (e.g., between about 50% and about 99.9%, between about 70% and about 95%) of the total weight of the fiber web. In some embodiments, the resin component comprises greater than about 0.1% (e.g., between about 0.1% and about 50%, between about 5% and about 40%, between about 5% and about 30%) of the total weight of the fiber web. Additional additives, when present, may comprise less than about 15% (e.g., less than about 5%) of the total weight of the fiber web.

It should be understood that in some embodiments the fiber web may include fiber component(s), resin, and/or additives outside the above-noted ranges.

In general, the fiber components of the web may include non-binder fibers and binder fibers. As used herein, non-binder fiber refers to all other types of fiber other than binder fiber. In some embodiments, the fiber web may include more than one type of fiber. For example, in some embodiments, the fiber web may include a blend of non-binder fibers and binder fibers. In some of these embodiments, the binder fibers may be the principal fiber type. That is, the weight percentage of binder fiber may be greater than the weight percentage of non-binder fiber. For example, the non-binder fiber may comprise less than 50 weight percent (e.g., between 5 and 40 weight percent, between 0 and 5 weight percent) of the total weight of the fiber components in the web and the binder fiber may comprise greater than 50 weight percent (e.g., between 60 and 95 weight percent), or greater than 75 weight percent (e.g., between 90 and 100 weight percent) of the total weight of the fiber components in the web. In some embodiments, the fiber web includes only binder fiber and no non-binder fiber.

It should be understood that some embodiments may include fiber compositions and weight percentages outside the above-noted ranges.

Suitable compositions for the non-binder fiber include synthetic materials, glass and cellulose. In some embodiments, synthetic fibers are preferable. Suitable synthetic materials for use as non-binder fibers include thermoplastics and non-thermoplastic materials. Examples of suitable synthetic materials include polyolefins (e.g., polypropylene), polyesters (e.g., polyethylene terephthalate, polybutylene terephthalate), copolyesters, polyamides (e.g., nylon 6, 66, 11, 12, 612; meta aramids), polyacrylonitrile, poly tetrafluoroethylene (PTFE), PEEK, PEK, PPS, melamine, polycarbonate, polyhetrocyclic compounds, polybenzidiazole (PBI) and polylactic acid. Other suitable synthetic materials include regenerated cellulosic materials (e.g., rayon, lyocell) and certain inorganic materials (e.g., carbon, boron, aluminum oxide, silicon carbide). It should be understood that blends of the above-noted materials and other types of synthetic fibers may also be used.

As noted above, the non-binder fibers may be formed of cellulose. Suitable cellulose fiber compositions include softwood fibers, hardwood fibers and combinations thereof. Examples of softwood cellulose fibers include fibers that are derived from the wood of pine, cedar, alpine fir, douglas fir, and spruce trees. Examples of hardwood cellulose fibers include fibers derived from the wood of eucalyptus (e.g., Grandis), maple, birch, and other deciduous trees.

As noted above, the non-binder fibers may be formed of glass. Suitable glass fibers may include chopped strand glass fibers or microglass fibers.

In general, the non-binder fibers may have any suitable dimensions. In some embodiments, the average diameter of the non-binder fibers are between about 1 micron and about 100 microns; and in some cases, between about 8 microns and 40 microns. In some embodiments, the aspect ratio of the non-binder fibers range between about 10 and about 10000; and, in some cases, between about 750 and about 6000.

As noted above, the fiber web may include binder fibers. The binder fibers may have any suitable composition. In some embodiments, the binder fibers may have a single composition; or, in other embodiments, the binder fibers may have multiple compositions. That is, an individual binder fiber may have a single composition in some embodiments; or, in other embodiments, an individual binder fiber may have multiple compositions. When the fibers have multiple compositions, the fibers may be referred to as multi-component fibers. An example of a multi-component fiber is a bi-component fiber which includes a first material and a second material. The first material may have a lower melting point than the second material, and can be melted so that it functions as a binder during web formation. For example, the melting temperature of the first material may be less than 225° C., less than 180° C., less than 110° C., or less than 80° C. Multi-component fiber may have a variety of spatial arrangements of their components including a core-sheath configuration (e.g., the first material may be a sheath material that surrounds the second material which is a core material), a side by side configuration, a segmented pie arrangement, a tri-lobal arrangement (e.g., the first material may be at the tip of the lobe) and an arrangement of localized regions of one component in the other component (e.g., "islands in sea").

Suitable compositions for binder fibers include polyesters (e.g., co-polyester, PET, undrawn PET, coPET), vinyl compounds (e.g., polyvinyl chloride, polyvinyl alcohol, vinyl acetate, polyvinyl acetate, ethylene vinyl acetate), polyolefins (e.g., PE, PP), polyurethanes and polyamides (e.g., co-polyamide) materials. These compositions may be used as single component or in multi-component binder fibers. Examples of suitable multi-component fibers include polyolefin (e.g., polyethylene (HDPE, LLDPE), polypropylene)/polyester, coPET (e.g., melt amorphous, melt crystalline)/polyester, coPET/nylon, and PET/PPS. In this listing of multi-component fibers, the convention is to list the material having the lower melting temperature (e.g., first material) separated from the material having the higher melting temperature (e.g., second material) with a "/". Other suitable compositions are known to those of skill in the art.

In general, the binder fibers may have any suitable dimensions. In some embodiments, the average diameter of the binder fibers is between about 5 micron and about 50 microns; and in some cases, between about 10 microns and 40 microns. In some embodiments, the aspect ratio of the binder fibers range between about 10 and about 10000; and, in some cases, between about 750 and about 6000. It should be appreciated that other dimensions of the binder fibers may also be suitable.

As noted above, in addition to the fiber component(s), the fiber web can include a resin component. In general, any suitable resin may be used. Examples of suitable resins include polyesters, polyolefins, vinyl compounds (e.g., acrylics, styrenated acrylics, vinyl acetates, vinyl acrylics, polystyrene acrylate, polyacrylates, polyvinyl alcohol, polyethylene vinyl acetate, polyethylene vinyl chloride, styrene butadiene rubber, polyvinyl chloride, polyvinyl alcohol derivatives), polyurethane, polyamides, polynitriles, elastomers, natural rubber, urea formaldehyde, melamine formaldehyde, phenol formaldehyde, starch polymers and combinations thereof. It should be understood that other resin compositions may also be suitable. In some embodiments, the resin may be a thermoset and, in some embodiments, a thermoset/thermoplastic combination.

The resin may be in the form of a latex such as a water-based emulsion. In some embodiments, the resin may be in the form of a dispersion, powder, hot melt, and/or solution.

In some embodiments, it may be preferable for the composition of the resin to be similar to the composition of at least some of the binder fiber (and, in some cases, substantially all of the binder fiber). In some embodiments, the resin may comprise a polymer that is in the same class as a polymer that forms a portion (e.g., when multi-component binder fibers are used), or all (e.g., when single component binder fibers are used) of the binder fibers. For example, the binder fiber and the resin may both comprise materials from the following classes: polyesters, polyolefins, polyamides, vinyl compounds and polyurethanes. Such embodiments may be particularly well-suited for enhancing stiffness of the fiber web. In some cases, the resin may have the same composition as at least one of the components of at least some of the binder fiber (and, in some cases, substantially all of the binder fiber). In some of these cases, the binder fiber may be multi-component fiber (e.g., bi-component fiber such as a core-sheath fiber). For example, the multi-component fiber may be copolyester/PET fiber and the resin is copolyester.

In some embodiments, the resin may include a cross-linking agent. Suitable cross-linking agents are known to those of skill in the art. In some embodiments, the resin does not include a cross-linking agent.

The fiber web may also include other appropriate additives that may be added to impart desirable properties to the fiber web and/or added for processing purposes. Suitable additives may include one or more of the following: flame retardants, oil repellants, water repellants, dyes, pigments, optical brighteners, anti-bacterial agents, anti-fungal agents, UV inhibitors, acids for pH control during processing, thickeners, surfactants, defoaming agents, and anti-oxidants. It should be understood that other additives are also possible. In some cases, these additives may be incorporated into the fiber component(s); or, in other cases, the additives are added as separate components.

FIG. 1 illustrates a fiber web 10 according to some embodiments. The web is illustrated after a pleating process, as described further below. The web includes a series of pleats 12 which extend across the web. As shown, the pleats may comprise folds that are generally sharp and even.

In general, the pleats may be present in any suitable range of frequency. For example, the frequency of pleats may be between about 1 pleat/inch and about 12 pleats/inch; and, in some embodiments, between about 2 pleats/inch and about 6 pleats/inch. In some embodiments, the fiber web may include regions having different pleat frequencies; though, in other embodiments, the frequency remains relatively constant across the fiber web.

In general, the pleats may have any suitable height. The pleat height is measured as the vertical distance between a peak (p in FIG. 1) and an adjacent valley (v in FIG. 1). The pleat height may be between about 0.5 inches and about 14 inches; and, in some cases, between about 1 inch and about 6 inches. In some embodiments, the fiber web may include a pleat height that is relatively constant across the web; though, in other embodiments, the peak height may vary across the web.

It should be appreciated that other pleat frequencies and heights may also be suitable and will depend, in part, on the application in which the fiber web is used.

The pleatability of a fiber web may be quantified according to measurement techniques. One suitable technique measures the web's score foldability index (SFI) which employs a method that is similar to AATCC-66 "Wrinkle Recovery of Fabrics: Recovery Angle Method". In general, the SFI is a measure of a web's ability to accept and retain a fold. When measuring the SFI, the fiber web is scored by placing a rectangular score bar of 6.875 in×4.875 in perpendicular to the machine direction of a web sample and applying 50 psi pressure using a compression press for a time of less than 1 second. The temperature of the sample and score bar was maintained at ambient temperature (24° C.). A smaller sample of 1 inch×4 inches is prepared so that the score line extends perpendicularly across the width of the sample to divide the sample into two equal-sized portions. The sample is then folded across the score line and a dead weight of 1853 grams is centered on the fold and applied for 30 seconds. After removal of the weight, the fold angle (i.e., angle between the two portions of the sample) is measured after 5 seconds and after 30 seconds of recovery. The measured angle and time period (e.g., 5 seconds, 30 seconds) are reported as the SFI.

In some embodiments, fiber webs have an SFI after 5 seconds of less than about 70°; in some embodiments less than about 60°; in some embodiments less than about 50°; in some embodiments, less than about 40°; in some embodiments, less than about 30°; and, in some embodiments, less than about 25°. In some embodiments, fiber webs have an SFI after 30 seconds of at less than about 80°; in some embodiments less than about 70°; and, in some embodiments less than about 60°; in some embodiments, less than about 50°; in some embodiments, less than about 40°; and, in some embodiments, less than about 35°.

As noted above, the fiber webs may have a high permeability. Permeability relates to the ability of a fiber web to transmit fluid. It can be expressed as the volume of fluid per unit of time that passes through a unit area of a fiber web at a fixed differential pressure. For example, the permeability of the fiber web may be greater than about 400 cubic feet per minute per square foot (cfm/sf). In some embodiments, the permeability may be greater than about 500 cfm/sf (e.g., between about 500 cfm/sf and about 1200 cfm/sf, between about 500 cfm/sf and about 900 cfm/sf). In some embodiments, the permeability may be greater than 600 cfm/sf (e.g., between about 600 cfm/sf and about 1200 cfm/sf, between about 600 cfm/sf and about 900 cfm/sf). In some embodiments, the permeability may be greater than 700 cfm/sf (e.g., between about 700 cfm/sf and about 1200 cfm/sf, between about 700 cfm/sf and about 900 cfm/sf)

The permeability of the fiber web is measured according to ASTM D737: "Standard Test Method for Air Permeability of Textile Fabrics". The permeability of a fiber web is an inverse function of flow resistance and can be measured with a Frazier Permeability Tester (e.g., Frazier Permeability Tester 91A). The Frazier Permeability Tester measures the volume of air per unit of time that passes through a unit area of sample at a fixed differential pressure across the sample. Permeability is expressed in cubic feet per minute per square foot at a 0.5 inch water differential.

It should be understood that other suitable ranges of permeability for the fiber web may be possible.

As noted above, in some embodiments, it is advantageous for the fiber web to have a low thickness. For example, the thickness may be less than about 25 mils (e.g., between about 5 mils and 25 mils, between about 12 mils and about 25 mils, between about 15 mils and about 20 mils). In some embodiments, the thickness may be less than about 20 mils (e.g., between about 5 mils and 20 mils, between about 12 mils and about 20 mils, between about 15 mils and about 20 mils).

As used herein, the fiber web thickness is determined using a test based on ASTM D5729: "Test Method for Thickness of Nonwoven Fabrics" using an applied force of 0.125 psi on a 1.128" diameter presser foot.

It should be understood that other suitable ranges of thickness for the fiber web may be possible.

As noted above, the fiber webs may have a high stiffness. In some embodiments, the stiffness of the fiber web is greater than about 200 mg. In some embodiments, the stiffness is greater than about 400 mg (e.g., between about 400 mg and 1700 mg, between about 400 mg and about 800 mg). In some embodiments, the stiffness is greater than 500 mg (e.g., between about 500 mg and 1700 mg, between about 500 mg and about 800 mg).

As used herein, the stiffness values are the Gurley stiffness values and are measured using WSP 90.2: "Standard Test Method for Stiffness of Nonwoven Fabrics Using the Gurley Tester".

It should be appreciated that other suitable ranges of stiffness for the fiber web may be possible.

In general, the fiber web may have any suitable basis weight. For example, the basis weight of the fiber web may range from between about 40 g/m$^2$ and about 300 g/m$^2$; and, in some cases, or between about 60 g/m$^2$ and about 150 g/m$^2$. Other basis weights are also possible. The basis weight of the fiber web is measured according to ASTM D6242: "Test Method for Mass Per Unit of Nonwoven Fabric".

In some embodiments, the porosity of the fiber web is greater than about 70%. For example, the porosity may range between about 70% and about 99%, or between about 80% and about 95%. The porosity may be calculated as the grams per sq meter of the web divided by the product of its fiber density times thickness (Other porosities are also possible.

In general, the fiber web may be manufactured using conventional equipment. A variety of processing techniques may be used to manufacture the fiber web including dry laid processes, wet laid processes, air laid processes, spunbond processes and meltblown processes. One suitable dry laid process may use one or more carding machines. In some embodiments, (e.g., when one carding machine is used), a cross-lapper may also be used. In embodiments, that utilize multiple carding machines (e.g., 4 or 5 carding machines), the machines may be arranged in series in a carding line. In general, the carding machines are designed to separate fibers from impurities, align and deliver them to be laid down as a web. The machine(s) can include a series of rolls and drums that are covered with multiple projecting wires and/or teeth. Each carding machine in the series can deliver a carded web to a conveyor which runs across the series to superimpose carded web(s) from successive machines on top of one another to form the fiber web.

After the carding line, the resin is added to the fiber web. In some embodiments, the web passes through a saturator which applies the resin to the web. The saturator may be a foam bank which applies the resin in the form of a foamed resin dispersion. In some cases, a surfactant (e.g., ammonium dodecyl sulfate) may be added to the dispersion. It should be understood that other techniques for applying the resin may be used including saturation bonding, foam bonding, spraying, printing, powder coating, or other suitable methods.

After the resin is added to the fiber web, the web is then subjected to a heating step. The heating step may perform a drying function by removing the liquid phase of the resin. In some processes, the heating step may also function as a binding step by softening the binder so that it may become flowable and can perform its binding function. That is, during these embodiments, the fiber web is dried and the binder is softened during the same step.

In some embodiments, during the heating step, the binder fiber (or, a component of the binder fiber, such as the sheath, when multi-component fibers are used) may soften as the liquid phase of the resin evaporates and resin particles agglomerate and/or form a coating on the fiber. The binder and resin materials may co-mingle. That is, the polymers the binder and resin may be intimately blended. Such co-mingling may further enhance the stiffness of the resulting web which can increase pleatability. The co-mingling can be particularly effective when the resin and binder have a similar composition, as described above.

In some embodiments, the heating step occurs using a series of steam heated dryer cans. However, it should be understood that other heating methods are also possible including, for example, IR heaters, ultrasonics, microwave radiation, ovens, and through air bonders. Suitable drying temperatures may range between about 80° C. and about 200° C. (e.g., between about 110° C. and about 180° C.) Suitable heating times may range between about 5 seconds and about 50 seconds (e.g., between about 10 and about 30 seconds). Other heating temperatures and times may also be possible.

After the heating step, the fiber web is collected and further processed as desired. Further processing can include combining the web with one or more additional fiber webs to form a filter media. In some embodiments, the filter media is subjected to a pleating step to introduce the pleats. Pleating steps generally involve scoring the web(s) followed by applying pressure.

It should be understood that the fiber web, itself, may be pleated prior to being combined with any other web, or other component. The filter media may be further processed to form different filter elements.

Figure 2:
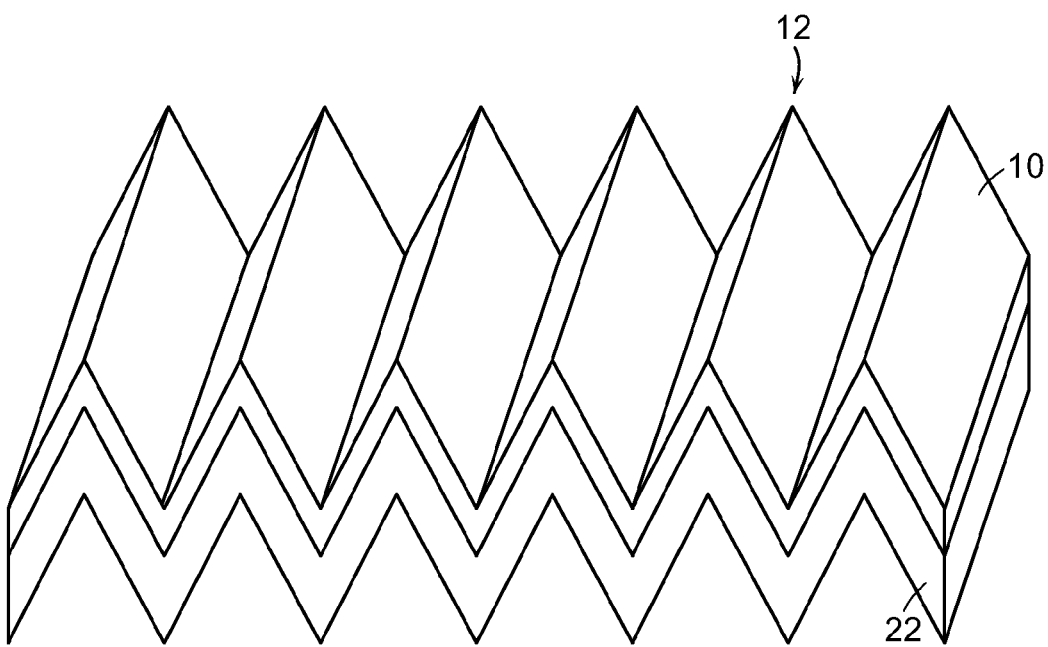
FIG. 2 depicts a filter media that includes a pleated fiber web backing and a pleated efficiency fiber web in accordance with some embodiments.

FIG. 2 illustrates a filter media 20 according to some embodiments. The filter media includes fiber web 10 as described above and shown in FIG. 1. Web 10 may exhibit the desirable characteristics described herein including a high permeability and stiffness, at a low thickness. In this embodiment, web 10 may function as a backing which provides mechanical integrity to the media but does not play a significant role in filtering contamination. The filter media includes a second fiber web 22. As shown, both web 10 and web 22 include pleats 12. The second fiber web may be designed to have a different function than the first fiber web. For example, the second fiber web may be desired to filter contamination. The second web may have a variety of different constructions and, in general, the filter media is not limited in this regard. One suitable construction is a melt blown fiber web, for example, as described in commonly-owned U.S. Patent Application Publication No. 2009/0120048 which is incorporated herein by reference in its entirety. The filter media may be incorporated into a suitable filter element, as described further below.

It should be understood that suitable filter media may include any additional fiber web(s) and may incorporate other features.

The web and media described herein may be incorporated into a number of suitable filter elements. It should be understood that the filter elements may have a variety of different constructions with the particular construction depending on the application in which the filter element is used.

In some cases, the filter element includes a housing that may be disposed around the filter media. The housing can have various configurations, with the configurations varying based on the intended application. In some embodiments, the housing may be formed of a frame that is disposed around the perimeter of the filter media. For example, the frame may be thermally sealed around the perimeter. In some cases, the frame may be configured to suit a panel filter application. In some cases, the frame may be configured to suit a cylindrical filter element or a channel flow application. The frame may be formed from various materials, including for example, cardboard, metal, polymers, or any combination of suitable materials. The filter elements may also include a variety of other features known in the art, such as stabilizing features for stabilizing the filter media relative to the frame, spacers, or any other appropriate feature.

The filter elements may generally be used in a variety of filtration applications, particularly those in which a pleated media is desired. Suitable applications are in the areas of room air cleaning, engine/cabin air cleaning, gas turbine filtration, dust collection, liquid filtration, as well as HVAC and HEPA applications amongst others.

The following non-limiting examples describe fiber webs that have been made according to aspects discussed herein.

EXAMPLES

Fiber webs were produced generally in accordance with the dry laid process described above.

For Trials 1-3 (see table below), the fiber component used to form the webs was 100% by weight binder fiber. The binder fibers used were concentric, sheath/core bi-component fibers including a copolyester sheath having a melting point of 110° C. and a PET core having a melting point of 255-260° C. For trials 1-3, fibers having a denier of 4 d and 15 d were blended together in different ratios as noted on the table below and the fibers ranged in diameter from 20 to 40 microns.

For Trial 4, binder fibers and a non-binder fibers were used. The binder fiber was that which was used for Trials 1-3 and comprised 80% of the total weight of the fiber. The remaining 20% by weight of the fiber comprised rayon fibers having a denier of 3 d.

All trials followed a similar process. The process utilized four carding machines arranged in series which each produced a carded web that was collected on a conveyor running beneath the cards. The carded webs from successive machines were superimposed on top of one another to form the fiber web.

After the carding line, a resin was added to the fiber web. The weight percentage of resin based on the total weight of the web is noted in the table below. The resin was a copolyester resin which was applied in the form of a foamed resin dispersion. In this embodiment the copolyester resin was composed of a blend of isophthalic acid, terephthalic acid and sodium sulfoisophthalic acid. The polyester resin dispersion was made into a foam through the inclusion of ammonium dodecyl sulfate at the level of 0.15% by weight (of the dispersion). After the resin was added to the fiber web, the web was then subjected to a heating step. The heating step included a series of steam heated dryer cans that applied a heat gradient that reached a maximum temperature of about 154° C. The heating step dried the fiber web and activated the binder during the same step.

The fiber webs were collected and further evaluated by measuring certain properties. The properties measured included basis weight, thickness, permeability, stiffness, and SFI as noted in the table below.

closure, and are intended to be within the spirit and scope of the invention. Accordingly, the foregoing description and drawings are by way of example only.

What is claimed is:

1. A fiber web having a permeability of greater than about 500 cfm/sf, a stiffness of greater than about 500 mg, and a thickness of less than about 25 mils.

2. The fiber web of claim 1, wherein the fiber web is a nonwoven web.

3. The fiber web of claim 1, wherein the fiber web includes synthetic fibers.

4. The fiber web of claim 1, wherein the fiber web includes bicomponent fibers.

5. The fiber web of claim 4, wherein the weight percent of the bicomponent fibers is greater than 50 percent by weight of the total weight percent of the fibers in the fiber web.

6. The fiber web of claim 1, wherein the fiber web includes binder fibers and non-binder fibers.

7. The fiber web of claim 6, wherein the binder fibers comprise greater than 50 percent by weight of the total weight of fibers in the fiber web.

8. The fiber web of claim 7, wherein the binder fibers are multi-component fibers.

9. The fiber web of claim 1, wherein the fiber web includes a resin.

10. The fiber web of claim 9, wherein the resin is in latex form.

11. The fiber web of claim 9, wherein the fiber web includes a binder comprising a polymer in the same class as the resin.

12. The fiber web of claim 11, wherein the binder and the resin are a polyester.

13. The fiber web of claim 1, wherein the fiber web has a permeability of between about 500 cfm/sf and about 1200 cfm/sf.

14. The fiber web of claim 1, wherein the fiber web has a stiffness of between about 500 mg and about 1700 mg.

15. The fiber web of claim 1, wherein the fiber web has a thickness of between about 12 mils and about 25 mils.

16. The fiber web of claim 1, wherein the fiber web has a basis weight of between about 40 g/m$^2$ and about 300 g/m$^2$.

17. The fiber web of claim 1, wherein the fiber web has a SFI after 5 seconds of less than about 70°.

18. A filter media comprising the fiber web of claim 1 as a backing and a second fiber web attached to the backing.

19. A filter element comprising the fiber web of claim 18.

20. A fiber web having a permeability of greater than about 500 cfm/sf, a thickness of less than about 25 mils, and a stiffness of greater than about 500 mg, the fiber web comprising multi-component fibers, wherein the multi-component

TABLE 1

| Trial No. | Fiber Blend | Blend Ratio | Resin (% of Web) | Basis Weight (g/m$^2$) | Thickness (mil) | Permeability (cfm/sf) | Stiffness (mg) | SFI ° (5 sec) | SFI ° (30 sec) |
|---|---|---|---|---|---|---|---|---|---|
| 1 | 15d/4d | 50/50 | 15 | 91 | 18 | 613 | 547 | 60.8 | 67.7 |
| 2 | 15d/4d | 50/50 | 19 | 94 | 18 | 631 | 577 | 60.0 | 67.8 |
| 3 | 15d/4d | 25/75 | 15 | 94 | 17 | 525 | 524 | 63.3 | 61.7 |
| 4 | 15d/4d/3d | 45/35/20 | 15 | 92 | 23 | 613 | 580 | 45.2 | 55.2 |

Having thus described several aspects of at least one embodiment of this invention, it is to be appreciated various alterations, modifications, and improvements will readily occur to those skilled in the art. Such alterations, modifications, and improvements are intended to be part of this dis- fibers comprise greater than 50 percent by weight of the total weight of fibers in the fiber web.

21. A fiber web having a permeability of greater than about 500 cfm/sf, a stiffness of greater than about 500 mg and a thickness of less than about 25 mils, wherein the fiber web comprises binder fibers and a resin, wherein the binder fibers comprise a polymer and the resin comprises a polymer, and the polymer of the binder fibers is in the same class as the polymer of the resin.

22. A method of filtering a fluid, the method comprising:
filtering a fluid using a filter element comprising a fiber web, the fiber web having a permeability of greater than about 500 cfm/sf, a stiffness of greater than about 500 mg, and a thickness of less than about 25 mils.

23. A method of manufacturing a fiber web comprising:
forming a fiber web that has a permeability of greater than about 500 cfm/sf, a stiffness of greater than about 500 mg, and a thickness of less than about 25 mils.

24. The fiber web of claim 1, wherein the fiber web has a permeability of between about 500 cfm/sf and about 1200 cfm/sf, a stiffness of between about 500 mg and about 1700 mg and a thickness of between about 12 mils and about 25 mils.

25. The fiber web of claim 24, wherein the fiber web is a nonwoven web and the fiber web includes synthetic fibers, bicomponent fibers, and the weight percent of the bicomponent fibers is greater than 50 percent by weight of the total weight percent of the fibers in the fiber web.

26. The fiber web of claim 20, wherein the fiber web has a permeability of between about 500 cfm/sf and about 1200 cfm/sf, a stiffness of between about 500 mg and about 1700 mg and a thickness of between about 12 mils and about 25 mils.

27. The fiber web of claim 21, wherein the fiber web has a permeability of between about 500 cfm/sf and about 1200 cfm/sf, a stiffness of between about 500 mg and about 1700 mg and a thickness of between about 12 mils and about 25 mils.

28. The method of claim 22, wherein the fiber web has a permeability of between about 500 cfm/sf and about 1200 cfm/sf, a stiffness of between about 500 mg and about 1700 mg and a thickness of between about 12 mils and about 25 mils.

29. The method of claim 28, wherein the fiber web is a nonwoven web and the fiber web includes synthetic fibers, bicomponent fibers, and the weight percent of the bicomponent fibers is greater than 50 percent by weight of the total weight percent of the fibers in the fiber web.

30. The method of claim 28, wherein the fiber web includes a resin in latex form and the fiber web includes a binder comprising a polymer in the same class as the resin.

31. The method of claim 30, wherein the binder and the resin are a polyester.

32. The method of claim 31, wherein the fiber web has a basis weight of between about 40 g/m$^2$ and about 300 g/m$^2$.

33. The method of claim 23, wherein the fiber web has a permeability of between about 500 cfm/sf and about 1200 cfm/sf, a stiffness of between about 500 mg and about 1700 mg and a thickness of between about 12 mils and about 25 mils.

* * * * *

UNITED STATES PATENT AND TRADEMARK OFFICE
CERTIFICATE OF CORRECTION

| | |
|---|---|
| PATENT NO. | : 8,083,828 B2 |
| APPLICATION NO. | : 12/488334 |
| DATED | : December 27, 2011 |
| INVENTOR(S) | : Bruce Smith et al. |

It is certified that error appears in the above-identified patent and that said Letters Patent is hereby corrected as shown below:

Column 11, Claim 25, lines 20-21, "synthetic fibers, bicomponent fibers" should read "synthetic fibers and bicomponent fibers"

Signed and Sealed this
Sixth Day of March, 2012

David J. Kappos
*Director of the United States Patent and Trademark Office*